(12) United States Patent
Schildmann

(10) Patent No.: US 6,360,896 B1
(45) Date of Patent: Mar. 26, 2002

(54) APPARATUS FOR CLEANING LIQUID FLUIDS

(75) Inventor: Hans Werner Schildmann, Heiligenhaus (DE)

(73) Assignee: Taprogge GmbH, a German limited liability company, Ketter (DE)

(*) Notice: Subject to any disclaimer, the term of this patent is extended or adjusted under 35 U.S.C. 154(b) by 0 days.

(21) Appl. No.: 09/510,393

(22) Filed: Feb. 22, 2000

(51) Int. Cl.⁷ ............................................... B01D 29/68
(52) U.S. Cl. ..................... 210/411; 210/413; 210/414; 210/497.01
(58) Field of Search ................................ 210/411, 412, 210/413, 415, 497.01, 414

(56) References Cited

U.S. PATENT DOCUMENTS

| | | | |
|---|---|---|---|
| 1,977,601 A | * | 10/1934 | Winton |
| 3,256,995 A | * | 6/1966 | Schnid et al. |
| 4,565,631 A | * | 1/1986 | Bitzer et al. |
| 4,904,397 A | * | 2/1990 | Elmer et al. |
| 5,728,297 A | * | 3/1998 | Koller |

FOREIGN PATENT DOCUMENTS

| | | | |
|---|---|---|---|
| DE | 8526836 | * | 3/1987 |
| DE | 3917520 | * | 3/1990 |
| DE | 4029439 | * | 5/1992 |

* cited by examiner

Primary Examiner—Thomas M. Lithgow
(74) Attorney, Agent, or Firm—Snell & Wilmer L.L.C.

(57) ABSTRACT

The invention concerns an apparatus for cleaning liquid fluids, in particular for the cooling water running to a heat exchanger, having a portion of pipe of circular cross section as a housing, a screening body and a suction device, which can be moved about an axis, on the inflow side for regional suction removal and consequently for cleaning the screening body. To provide broad freedom of design for shaping the apparatus in a simple way, while the advantages of the known apparatuses are to be essentially retained, it is provided according to the invention that the apparatus is provided with a portion of pipe of circular cross section as a housing and with a screening body which extends transversely in the portion of pipe and the cross section of which is designed as a U shape which is open toward the inflow side and has a bending radius that is constant in the bent region, or as part of this U shape, as well as with a suction device, which is arranged on the inflow side of the screening body and is arranged such that it can be moved about an axis lying transversely in the portion of pipe and serves for regional suction removal and cleaning of the screening body.

11 Claims, 3 Drawing Sheets

APPARATUS FOR CLEANING LIQUID FLUIDS

BACKGROUND

1. Technical Field of the Invention

The invention concerns an apparatus for cleaning liquid fluids, in particular for the cooling water running to a heat exchanger, having a portion of pipe of circular cross section as a housing, a screening body and a suction device, which can be moved about an axis, on the inflow side for regional suction removal and consequently for cleaning the screening body.

2. Background of the Invention

DE 36 40 638 describes cleaning apparatuses for screening bodies that are installed in feed lines of heat exchangers, cover the cross section of the feed line and remove deposits on the flow-accepting side of the screening body by suction via a rotatable nozzle. The sectional plane of the rotationally symmetrical screening body lies in a cross-sectional plane of the feed line, for example in that of a flange connection. The nozzle of the suction-removal device is rotatable about the center axis of the portion of pipe or the feed line by an electric motor, the motor being arranged within the feed line on the flow-discharging side of the screening body. Access to the drive motor from the outside and similarly to bearings and seals is hindered in the case of this design. In addition to this, there is a relatively high space requirement, caused by the overall height of the cleaning apparatus.

U.S. Pat. No. 2,275,958 discloses an apparatus in which the actual filtering takes place in a housing which is generally cast and is mounted such that it is accessible via a cover in order to obtain an adequate screening area in the case of rotating suction devices. The axis of rotation is enclosed by a cylindrical screening body and lies perpendicular to the pipe axis of the feed line in a complex housing of its own, in which a fluid passes through the screening body from inside to outside. The motor lies outside the supply lines and can therefore be accessible from outside, as can seals or bearings. On account of the special design and overall size in relation to the nominal width of the feed line of the housing, the production of this known apparatus involves high expenditure and, in particular with the large nominal widths often required today, is so expensive that it cannot be used for filtering water at great flow rates.

The same also applies to the cleaning apparatus known from U.S. Pat. No. 1,977,601, which is designed as a valve. Screening bodies which correspond in cross section to a quarter circle, a half circle or virtually a full circle, with their opening facing the inflow side of the water, are proposed. The screening areas are also cleaned by a suction device. However, instead of a portion of pipe, complicated housings which can only be produced by casting are used, and the housings interact inseparably with the screening body and the suction device. Furthermore, it is required to form in the housing specially shaped pockets, which are intended to receive the dirt particles transported into the pockets from the screening area by the rotor.

DE 39 17 520 discloses a cleaning apparatus of which the screening body and suction device are fitted transversely in a pipe housing. However, as represented in FIGS. 1 and 2, the screening body is preferably made up of a plurality of different segments in order to come as close as possible to the circular shape of the cross section of the portion of pipe.

SUMMARY OF THE INVENTION

It is the object of the invention to improve an apparatus of the type stated at the beginning in such a way that further freedom of design for shaping the apparatus is provided in a simple way, the advantages of the known apparatuses being essentially retained.

To achieve this object, the invention proposes a cleaning apparatus having the features according to claim 1, which is hereby made to constitute part of the description.

The invention consequently dispenses with a complicated housing. Instead, a simple portion of pipe, in other words a piece of pipe of circular cross section, becomes an integral part of the apparatus as a filter housing. The invention uses in particular a screening body that is preferably bent from a metal screening plate, the cross section of which is designed as a U shape which is open toward the inflow side and has a bending radius that is constant in the bent region, or as part of this U shape.

According to the invention, the screening body consequently extends transversely in the portion of pipe, the regions which lie between the screening body and the inner wall of the circular portion of pipe being closed in a suitable way, for example by plates. For the invention it is important that the cross-sectional shape of the screening body is always oriented along the stated U contour. This means that the cross section is, for example, of a U-shaped design, with leg parts running parallel to one another and to the pipe wall, following on from the bent portions of the legs, or that the cross-sectional shape makes use only of part of the U contour, so that a relatively flat screening body is obtained. Of decisive significance in any case is that the cross section has a constant bending radius in the bent region, primarily for the interaction between the screening area and the suction device, but also for the desired filtering action and for the intrinsic stability of the screening area. The invention consequently allows—depending on circumstances and need—virtually any desired choice of a cross-sectionally full or partial U shape as a screening area.

If a U shape with relatively long straight legs, extending parallel to the wall of the portion of pipe, beyond the bent region is chosen, the overall filtering area available is increased in size, even if the filtering area added in the region of the straight-extending legs cannot be cleaned with a suction device that can be swiveled about an axis. However, this has the effect of adding filtering areas which in emergencies serve as auxiliary screening areas for the passage of water, that is to say if there is imminent blockage of the screening area holding back the dirt particles. During normal filter operation, water only flows to a slight extent—if at all—through the auxiliary screening areas. With increasing soiling and imminent blockage of the screening area that is covered by the suction device and is normally cleaned, however, the cooling water flows increasingly through these auxiliary screening areas. As a result, for example, valuable time can be gained, in which the screening areas covered by the suction device can be cleaned after all, in order to prevent enforced shutdown. After all, definitive blockage of the screening area would bring the water flow to a standstill and have the consequence of an immediate enforced shutdown of the entire installation, for example an entire power plant block, for safety reasons.

The U shape, according to the invention, of the cross section of the screening body also ensures in particular that the cooling-water flow is not adversely affected by the straight legs of the U shape, extending parallel to the inner wall of the portion of pipe, and for example that vortexing at the inlet opening of the screening body is avoided. Rather, the water entering the screening body can flow along the straight and level running screening areas of the U shape of the screening body without vortexing until it meets the screening area in the bent region of the U shape. An increase in the size of the screening area brought about by using a screening body forming virtually a full circle in cross section, according to U.S. Pat. No. 1,977,601, or else a smaller increase in size in this way would always have the consequence of a very undesired vortexing of the water flow, on account of the constriction occurring in the inlet cross section of the screening body with subsequent widening, and the said vortexing may well reach into the bent region of the U shape of the screening body and reduce or even prevent the passage of water and the filtering action of wide regions of the screening body.

If, by contrast with the abovementioned relatively high U shape, only part of the bent region of the U-shaped screening area cross section is chosen as the screening area, a different objective is achieved, that is a cost saving, which however presupposes that the existing screening area is adequate. The swiveling angle, and consequently also the time taken for suction removal by the suction device for cleaning the filter areas, can in this case be shortened. The choice of a relatively flat U shape of the screening body cross section is significant in particular for greater nominal widths of the portion of pipe, since in this case a considerable reduction in the time taken for suction removal, and consequently a significant reduction in the cooling water removed by the suction device, can be achieved, so that more cooling water that flows through the pipe cross section is available for the heat exchanger generally connected downstream. In addition, in particular in closed cooling circuits, the devices connected to the suction device for receiving the amounts of dirt and water removed by the suction device can be made much smaller, saving space, in other words with lower costs in production and maintenance. The required screening area size for this embodiment is based on the maximum permissible pressure losses permitted in the respective case.

Using the U-shaped contour also allows, however, any desired intermediate solution between a relatively high and a relatively flat portion of the U shape of the screening body cross section to be used in practice, for example even a screening body of which the ends of the legs coincide with the end of the bent region. In this way, the suction device can cover, and clean, the entire screening area. There is no need for additional auxiliary filtering areas. In this case, it is also possible for the range of movement or swiveling of the suction device to clean only part of the screening area, so that in this case uncleaned auxiliary screening areas are also available. By making control system settings, furthermore, combined operating modes of the suction device can be chosen, for example occasional partial cleaning of the screening area that can be covered by the suction device, by which the cooling-water losses caused by the suction device can be reduced, can be coupled with complete cleaning at other times of the screening area that can be covered.

The invention is essentially based on the fact that generally the dirt is deposited on a screening area primarily in the central regions of the screening area, lying transverse to the flow of water, with the result that these regions also have to be cleaned the most frequently. With the aid of a cross-sectionally U-shaped screening area, an appropriate setting can be found for virtually all applications, on the one hand optimizing investment and operating costs and on the other hand providing safety reserves.

The abovementioned possibilities are considered in subclaims 2–5. Subclaim 6 is directed at configurations of the screening body which are provided with webs or ribs on their inner side, that is on their side facing the suction device. Although this design is known in principle from DE 39 17 520 as well, it can also be used advantageously within the scope of the invention. The development provided by the invention according to claim 7 provides that the height of the webs preferably protruding radially from the inner side of the screening area decreases from the center of the bent region of the screening body toward both side areas in such a way that the free edges of the webs lie in cross section on a circle, the center point of which lies outside the bent region and coincides with the pivoting axis of the suction device. This makes it possible for the height of the webs at the ends of the bent region to be close to or equal to zero and for relatively high webs to be obtained at the center of the bent region, where most dirt particles are deposited.

Subclaims 8 and 9 are directed at an advantageous way of increasing the inside diameter of the pipe housing, which is explained in more detail below. Subclaims 10, 11 and 12 concern an advantageous arrangement, shaping and operating mode of the suction device.

The development of the apparatus according to claim 13 serves to provide a bypass for emergencies, if blockage of the apparatus is imminent or has already occurred. The provision of additional screening areas at the end faces of the screening body is envisaged according to subclaim 14.

Since the achievable screening area is restricted by the constraints dictated by the U shape of the cross section of the screening body, it is expedient in certain cases to choose the inside diameter of the pipe housing to be greater than the clear diameter of the adjoining pipelines. This takes place in a particularly simple way by the pipe housing being provided with inner flanges, which are combined with outer flanges present on customary sections of pipe. In this way, an increase in diameter of up to 20% is achieved in comparison with the inside diameter of the adjoining pipes.

A particular advantage of the apparatus according to the invention is that it is extremely short, that is it can be accommodated in extremely restricted spaces by variable use of the basic cross-sectional shape of the screening body, corresponding to a "U". The actual space requirement is determined by the size of the lateral lead-throughs for the suction-removal pipe or the shaft for the suction device, including a certain distance from the connection flanges.

BRIEF DESCRIPTION OF THE DRAWINGS

Exemplary embodiments of the invention are explained in more detail below and are represented in the drawing, in which.

DETAILED DESCRIPTION OF THE EXEMPLARY EMBODIMENTS

Figure 1:
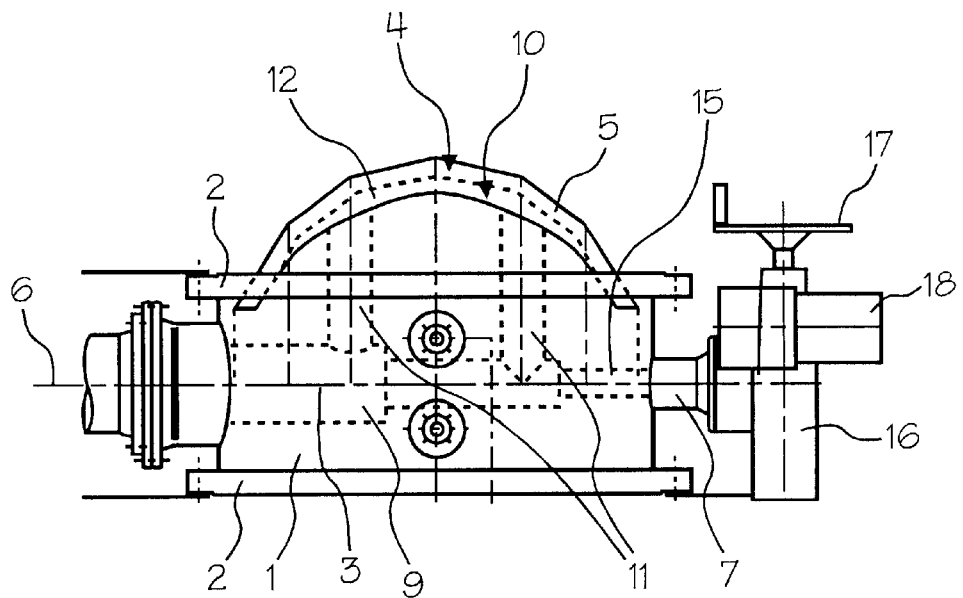
FIG. 1 shows a side view of a known apparatus for cleaning liquid fluids.

In FIG. 1, which shows an apparatus known from DE 39 17 520, there is reproduced a pipe housing 1 with outer flanges 2 at the end faces, which is screwed for example into the supply line to a heat exchanger in a power plant. Noticeable is the low overall height of the actual pipe housing 1, comprising a portion of pipe. Above a plane 3, which coincides with a cross-sectional area of the pipe housing 1, there is a screening body 4, which comprises a plurality of frustoconical screening portions 5. Altogether, there are six such portions, respective pairs being of similar shapes.

Since the envelope of the screening body 4 follows a polygonal course (cf. FIG. 2), internals (not represented) which form a fluid-impermeable bridge between each screening portion and the wall of the housing are present within the plane 3 between the ends of the screening portions 5 and the wall of the housing. These bridges may contain plates or else comprise plates which can be swiveled, and are consequently permeable to the fluid to be cleaned, to provide an emergency passage. The actuation of such flaps or plates may be performed automatically with the aid of shearing pins or a motorized mechanism.

Below the screening body 4 there is a suction-removal device 10, which is essentially formed by a stepped pipe 9, two conduits 11 and a suction ring 12. In this case, the suction ring is a half-open formation which is adapted to the contour of the screening body 4 and the inner side of which is connected to the conduits 11. The front edges of the suction ring, facing the screening body 4, are aligned in the individual cleaning positions with webs on the inner side of the suction body 4, so that in the suction region of the suction ring 12, in one of its operating positions, a segmental formation of the screening body is covered, that is it is subjected to cleaning.

The suction device 10 as a whole can be swiveled about a center axis, which is located within the plane 3 and at the same time is the center axis of flange lead-throughs 7 and 8, which are attached laterally to the pipe housing 1. The larger flange lead-through 8 receives the connection and the bearing of the stepped pipe 9, while the smaller flange lead-through 7 is passed through by a shaft 15, via which the swiveling movement of the suction device 10 is gradually performed over the entire region of the screening arrangement 4. Present for this purpose is a corresponding drive 16, which is generally driven by an electric motor 18, but in the event of a power failure can be actuated with the aid of a hand wheel 17. Adjoining the flange lead-through 8 is a suction line, via which a suction action can be applied to the suction ring 12.

Figure 2:
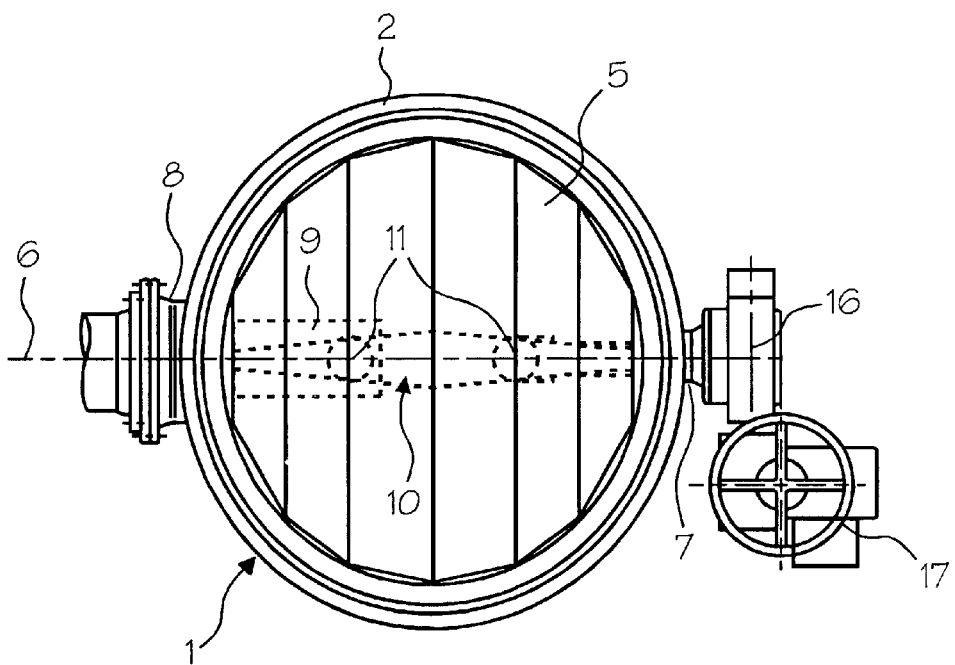
FIG. 2 shows a plan view of the apparatus according to FIG. 1.

During normal operation, the suction device 10 is in its central position, which is reproduced in FIGS. 1 and 2 and in which it opposes the fluid flow passing through the pipe housing 1 with the least resistance. The fluid flows from below into the housing 1 and passes the screening arrangement from bottom to top. At regular intervals or as and when needed, which can be established by measuring the difference in pressure over the screening arrangement 4, the suction device 10 is actuated, bringing about a reversal of flow through the screening arrangement within the region covered by the suction ring 12. As a result of this flow reversal, all contaminants accumulated on the underside of the screening arrangement 4 are detached and leave the apparatus via the stepped pipe 9. After a certain cleaning period of one region, the suction device 10 is moved into another region, which is then cleaned. This operation is repeated until all the regions of the screening arrangement 4 have been covered. After that, the suction device 10 returns to its starting position, unless the contamination of the cooling water to be filtered demands that cleaning be continued in virtually continuous operation—comparable to the movement of a windshield wiper.

Depending on the design of the screening arrangement 4, the suction device 10 is moved either in continuous suction operation or step-by-step with possibly interrupted suction action during the swiveling movement. The first operating mode is preferably chosen if the area of the screening body 4 to be subjected to suction removal is smooth, in other words there is an adequate seal between the suction ring 12 and the screening body 4 at every point. The second operating mode may be expedient if the screening body 4 bears webs (cf. FIG. 5, right-hand half of the screening body) which first have to be brought into line with the bounding walls of the suction ring 12 before a satisfactory suction action, and consequently cleaning action, can be achieved. It goes without saying that ribs or webs on the underside of the screening body 4 must be matched to the shape of the suction ring 12, in other words be designed such that they are congruent with the latter. This also applies to the regions lying close to the plane 3, although only the contact contour has to coincide, the further shaping of the webs being free. An oblique position of the webs in the regions close to the plane 3 in the direction of the fluid flow is consequently readily possible for reducing the resistances.

Figure 6:
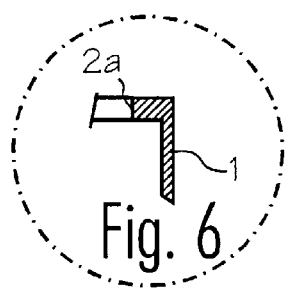
FIG. 6 shows a representation of part of another embodiment of a flange of a pipe housing in section.

In FIG. 6 it is shown that the pipe housing may be provided with an inner flange 2a, while the connection to the neighboring pipelines is performed in a customary way with the aid of outer flanges on the pipelines. This produces an increase in the size of the cross-sectional area which almost amounts to the flange width and also provides a welcome increase in the size of the screening area. Since regions of the area at the zone of transition to the pipe housing wall must remain unused as screening area, said increase in size can be used to compensate for these regions of loss.

Figure 3:
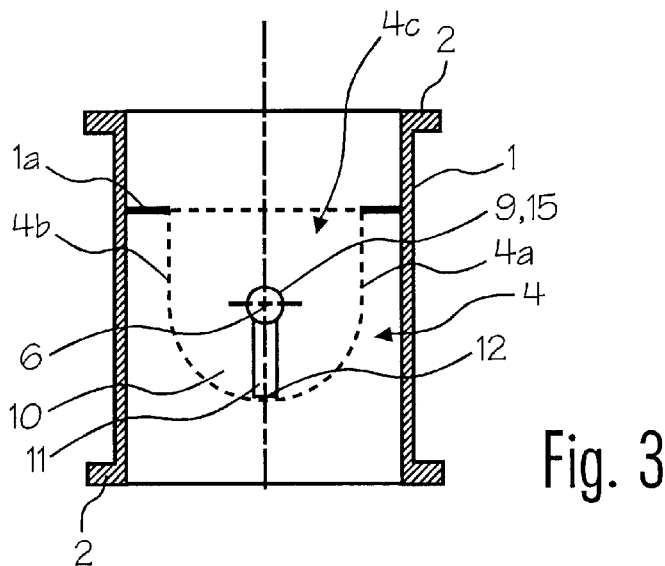
FIG. 3 shows a representation of a first exemplary embodiment of the invention as a longitudinal section.
Figure 4:
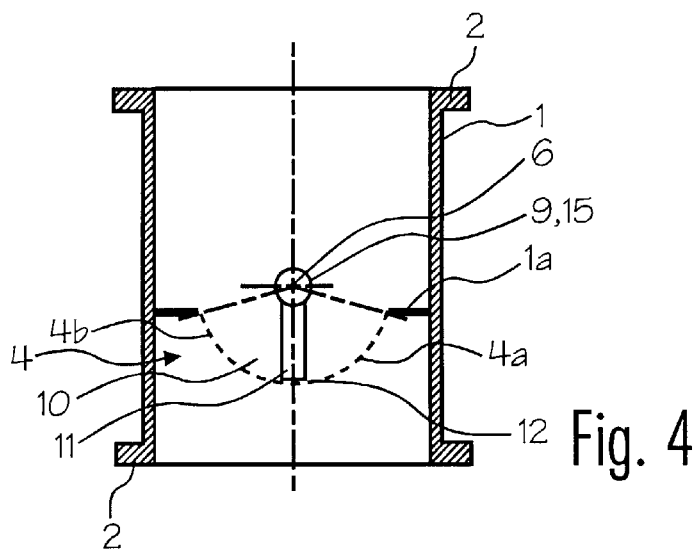
FIG. 4 shows a representation of a second exemplary embodiment of the invention, likewise as a longitudinal section.
Figure 5:
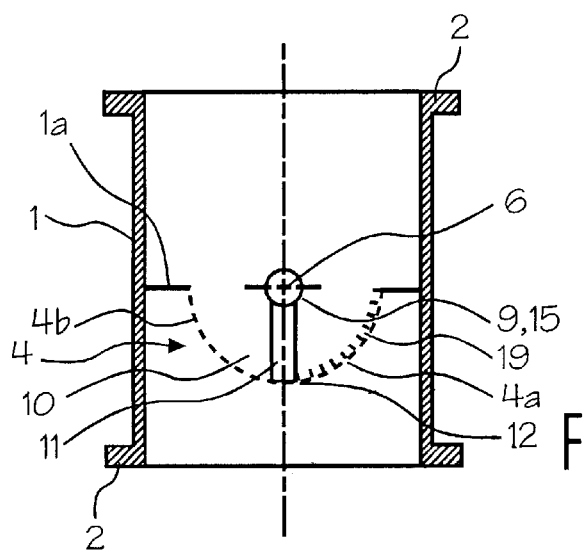
FIG. 5 shows a representation of a third exemplary embodiment of the invention, again as a longitudinal section.

In the three exemplary embodiments of FIGS. 3, 4 and 5, the same reference numerals as in the exemplary embodiment described above also designate the same parts or parts of the same type with an identical mode of action or operating mode. Therefore, only the differences between the known apparatus according to FIGS. 1 and 2 and the three exemplary embodiments according to FIGS. 3, 4 and 5 that are covered by the invention are discussed below:

Used as the housing of the apparatus in all three exemplary embodiments, as already assumed in the description above, is a cross-sectionally circular portion of pipe 1 with outer flanges 2, in which the screening body 4, U-shaped in cross section according to the invention, is arranged such that it runs transversely and preferably extends (not represented) as far as possible between mutually opposite regions of the inner wall of the portion of pipe 1. The intermediate spaces lying between the inner wall of the portion of pipe 1 and the screening body 4 are covered by correspondingly shaped plates 1a, so that the cooling water flowing from top to bottom through the portion of pipe 1 in all three exemplary embodiments inevitably flows into the opening of the U-shaped screening body 4. The screening body 4, bent from a metal screening plate such that it is U-shaped in cross section, with a constant bending radius, has in each case a pair of legs 4a, 4b. In the first exemplary embodiment according to FIG. 3, the legs 4a, 4b extend significantly beyond the bent region, in such a way that the length of the straight leg portions, parallel to the wall of the portion of pipe 1, corresponds approximately to the bending radius. The straight-running portions of the legs 4a, 4b form auxiliary screening areas, the action of which has already been explained in detail in the introduction of the description. The suction device 10, with the conduits 11 (cf. FIGS. 1 and 2) as well as the suction ring 12 and the stepped pipe 9 and the shaft 15, swivels as in the known apparatus about an axis 6 lying transversely in the portion of pipe 1. This applies to all three exemplary embodiments, the movement of the suction device 10 preferably being oscillatory and likewise preferably, but not necessarily, cleaning all the regions of the screening area of the screening body 4 in the bent region of the same. The possible operating modes, which also apply to all three exemplary embodiments, have likewise already been explained at the beginning. In the second exemplary embodiment according to FIG. 4, the screening body 4 extends only over a partial region of the U shape. In the third exemplary embodiment, the cross-sectionally U-shaped screening body 4 extends over the bent region. Therefore, just as in the case of the second exemplary embodiment according to FIG. 4, the suction device 10 can, but does not necessarily have to, clean the entire screening area of the screening body 4.

The partial representation in FIG. 6 clearly illustrates, as already mentioned above, the possibility of increasing the size of the inside diameter of the portion of pipe 1 in a simple way by using an inner flange 2a, which in this case of course also replaces the lower outer flange 2. The increase in diameter allows a correspondingly larger screening body 4, with a correspondingly larger screening area, to be used.

In the third exemplary embodiment according to FIG. 5, a further embodiment of the screening body 4 is represented by webs 19 being depicted on the inner side of the leg 4a of the screening body 4, this embodiment, if chosen, of course being realized in this manner on both legs 4a, 4b. The suction device 10 is adapted to the webs, which is not represented in FIG. 5, and a corresponding adaptation of their operating mode is also possible.

Figure 7:
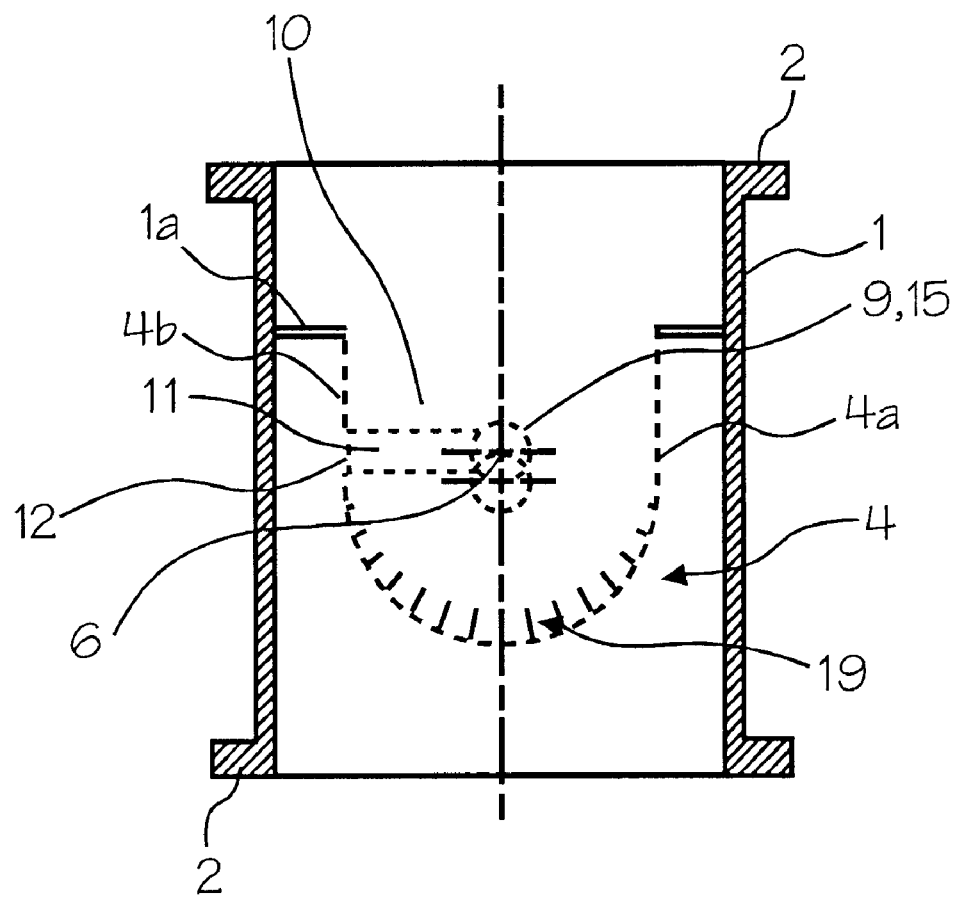
FIG. 7 shows a representation of a fourth exemplary embodiment of the invention, again as a longitudinal section, with webs of various heights on the inner side of a screening body.

FIG. 7 shows a fourth exemplary embodiment in which, as can be seen in the drawing, the height of the webs 19 decreases from the center of the bent region of the screening body 4 toward both side areas or legs 4a, 4b in such a way that the free edges of the webs 19, seen in cross section, lie on a circle, the center point of which lies outside, that is above in the drawing, the bent region and coincides with the pivoting axis 6 of the suction device 10. It can be seen that the web height at the center of the bent region is much higher than at the side areas or at the legs 4a, 4b at the end of the bent region. This provides the screening body 4 with a larger entry opening for the approaching flow of water in comparison with the case represented in the right-hand part of FIG. 5, where the webs 19 at the end of the bent region bring about a constriction of the entry opening of the screening body 4. In the embodiment according to FIG. 7, the web height is also at its greatest where the occurrence of dirt particles is usually greatest, that is at the center of the bent region.

The plates 1a serving for covering the intermediate spaces between the inner wall of the portion of pipe 1 and the screening body 4 can form a bypass in emergencies, if blockage of the apparatus is imminent or occurs. For this purpose, at least one of the plates 1a is mounted such that it can swivel, as a complete plate or at least with a portion of the plate, about an axis which runs transversely to the longitudinal axis of the portion of pipe 1. In this way, the plate 1a, or the portion of plate intended for this purpose, can be positioned perpendicularly with respect to the position represented in the drawing, so that the intermediate spaces are released for the flowing through of the cooling water.

As is shown by a dashed line at the height of the plates 1a in FIG. 3, the end faces 4c of the screening body 4 may be designed as additional screening or filtering areas, which either remain uncleaned or, at least in the bent region, can be covered and cleaned by radially running portions of the suction ring 12 of the suction device 10.

What is claimed is:

1. Apparatus for cleaning liquid fluids, in particular for the cooling water running to a heat exchanger comprising:

a portion of pipe of circular cross section as a housing;

a screening body which extends transversely in the portion of pipe, the screening body having a cross section designed as a U shape defined by a bent region and a pair of legs, the screening body being open toward an inflow side and having a bending radius that is constant in the bent region; and a suction device which is arranged on the inflow side of the screening body and is arranged such that it can be moved about an axis lying transversely in the portion of pipe and serves for regional suction removal and cleaning of the screening body, whereby the legs of the U shaped screening body extend beyond the bent region of the screening body in parallel direction to the axis of the portion of pipe to form auxiliary regions of the screening body which are not covered by the suction device and therefore not cleaned, the auxiliary screening areas allow the emergency passage of water in the event of a blockage in the bent region.

2. Apparatus according to claim 1, wherein the angular region of the screening area of the screening body that is intended for cleaning by the suction device can be preselected, and can be changed if need be, by corresponding setting of the drive control of the suction device.

3. Apparatus according to claim 1, wherein the length of the parts of the legs running straight and parallel to the axis of the portion of pipe is less than the bending radius.

4. Apparatus according to claim 1, wherein an intermediate space lying between an inner wall of the portion of pipe and the screening body is covered by a correspondingly shaped plate, the shaped plate is mounted such that at least a portion of the shaped plate can swivel about an axis directed transversely to the longitudinal axis of the portion of pipe as a bypass.

5. Apparatus according to claim 1, wherein an end face of the screening body is designed as an additional screening area which either remain uncleaned or in the bent region are covered and cleaned by radially running portions of a suction ring of the suction device.

6. Apparatus according to claim 1, wherein the screening body is provided on the side facing the suction device with webs of ribs, the arrangement of which is adapted to the path of movement of the suction device or a suction ring.

7. Apparatus according to claim 6, wherein the height of the webs decreases from the center of the bent region of the screening body toward both side areas in such a way that the free edges of the webs lie in cross section on a circle, the center point of which lies outside the bent region and coincides with the pivoting axis of the suction device.

8. Apparatus according to claim 1, wherein the diameter of the pipe housing is greater than the nominal size of a pipe to be connected.

9. Apparatus according to claim 8, wherein the greater diameter of the pipe housing is formed by an inner flange being respectively attached to the pipe housing and paired with an outer flange customary on sections of the pipe.

10. Apparatus according to claim 1, wherein the suction device is connected to two pipe stubs that are respectively led out from the pipe housing, one of which is provided with a drive for the movement of the suction device, in particular for a swiveling movement, and which are rigidly interconnected with the aid of a shaft.

11. Apparatus according to claim 1, wherein the suction device performs an oscillatory swiveling movement.

* * * * *